Dec. 16, 1958
W. R. J. WOOCK
2,864,419
JUICER
Filed Sept. 6, 1955
2 Sheets-Sheet 1
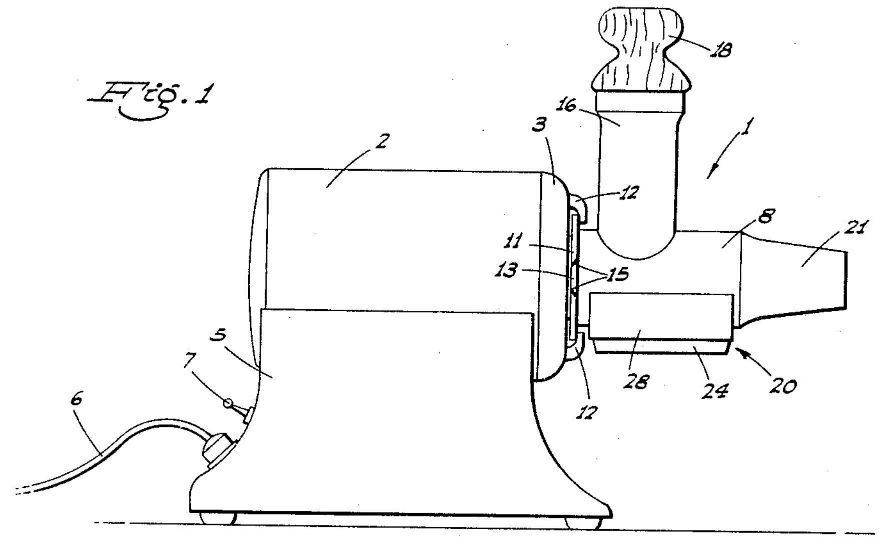
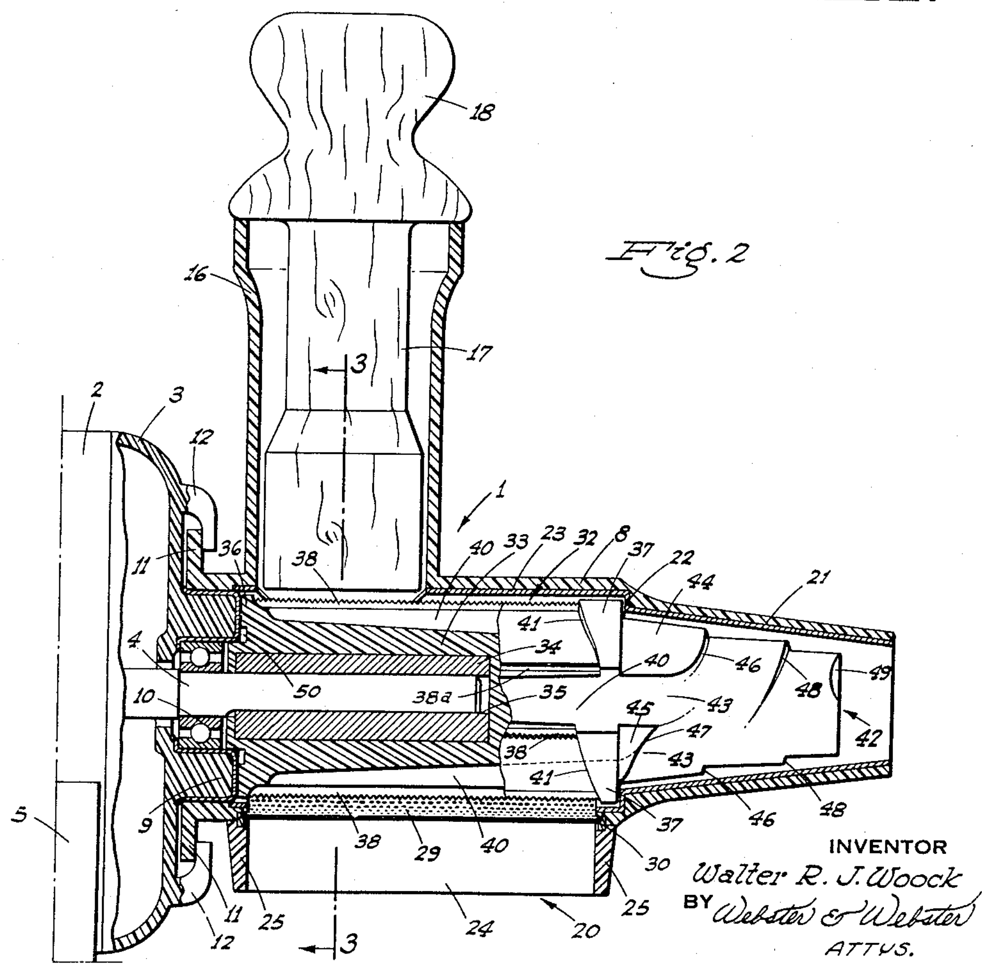

JUICER
Filed Sept. 6, 1955 2 Sheets-Sheet 2
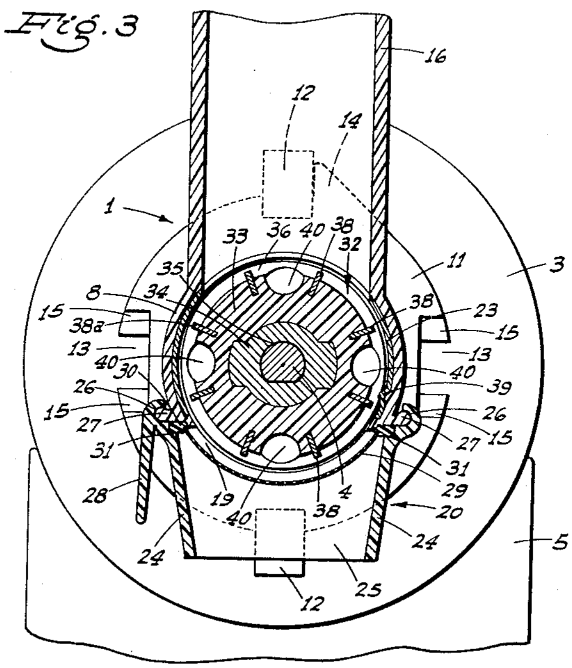
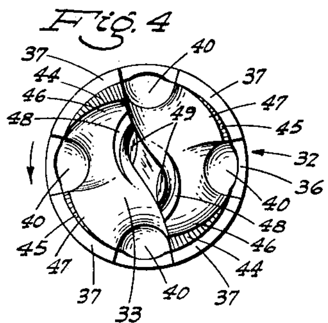
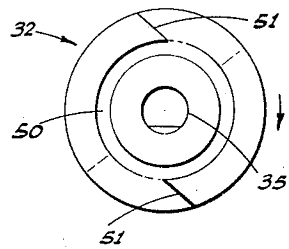
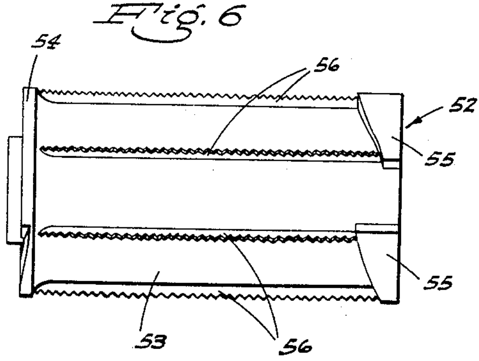
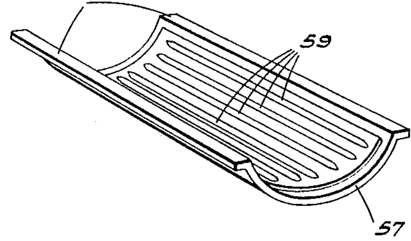
INVENTOR
Walter R. J. Woock
BY Webster & Webster
ATTYS.

United States Patent Office 2,864,419

Patented Dec. 16, 1958

2,864,419

JUICER

Walter R. J. Woock, Lodi, Calif.

Application September 6, 1955, Serial No. 532,516

6 Claims. (Cl. 146—76)

This invention is directed to, and it is a major object to provide, an improved electric motor driven appliance primarily adapted for use to rapidly and positively masticate fruit or vegetables, and to effect a maximum extraction of the juice therefrom, with the juice retaining the important and desirable natural values.

Another important object of this invention is to provide a juicer which includes a novel rotary cutter which is operative, within an enclosing body having a juice strainer at the bottom, to accomplish such mastication of the fruit or vegetables, pulping the same to a high degree, and also acting in a manner to produce forces which assure of substantially no juice retention in the pulp as separately discharged from the appliance.

An additional object of this invention is to provide a juicer, as in the preceding paragraph, wherein the rotary cutter is formed, as an extension thereof, with a novel pulp unloading auger or screw which runs in a nozzle extending axially from the outer or outlet end of the body which encloses said rotary cutter.

Still another object of the invention is to provide a juicer which embodies, on the inner end of the rotary cutter, a novel centrifugal pressure arrangement or "slinger" which prevents any of the extracted juice from gaining access to an adjacent bearing for the motor shaft on which said rotary cutter is mounted.

A separate object of this invention is to provide a juicer wherein a majority of the parts are of molded plastic, such as "nylon"; the body which houses the rotary cutter and the integral nozzle in which the pulp unloading auger or screw runs being parts constructed of such material. These particular parts are internally surfaced with a roll-formed, molded-in-place, stainless steel lining whose purpose is not only to assure of long wear, but also to permit of ready cleansing without retention of any scent or flavor which might otherwise transfer to and spoil a food material subsequently processed in the appliance.

Still another object of this invention is to provide a juicer which embodies a novel snap-on juice outlet spout at the bottom of the body which houses the rotary cutter; such body having a bottom opening, and the snap-on spout supporting a juice strainer in such opening.

A further object of the invention is to provide a juicer which includes means for its ready and convenient manual attachment to, or detachment from, the electric drive motor without the use of nuts, bolts, or screws; the parts of the juicer, when detached, being easily separated for cleansing.

A still further object of the invention is to provide a juicer, of the type described, which—by the simple expedient of substituting two readily interchangeable parts—can be converted for use to shred, or to homogenize, food materials.

It is also an object of the invention to provide a juicer which is practical, reliable and durable, yet exceedingly effective for the purpose for which it is designed.

These objects are accomplished by means of such structure and relative arrangement of parts as will fully appear by a perusal of the following specification and claims.

In the drawings:

Fig. 1 is a side elevation of the appliance; i. e., the juicer as shown in attachment with the electric drive motor.

Fig. 2 is an enlarged vertical sectional elevation of the juicer.

Fig. 3 is a cross section on line 3—3 of Fig. 2.

Fig. 4 is an outer end elevation of the pulp unloading auger or screw as formed on the outer end of the rotor; such structure being shown detached.

Fig. 5 is an inner end elevation of the rotor showing particularly the centrifugal pressure arrangement.

Fig. 6 is an elevation of a modified type of rotor, detached.

Fig. 7 is a perspective view of the concave filler plate adapted to be used in lieu of the strainer plate, and with the rotor of Fig. 6 for shredding or homogenizing.

Referring now more particularly to the drawings, and to the characters of reference marked thereon, and at present to Figs. 1–5 inclusive, the appliance comprises a juicer assembly, indicated generally at 1, adapted to be mounted in connection with one end of a horizontal-axis, electric motor 2 which includes a cap 3 at such end and an outwardly projecting drive shaft 4. The motor 2 is supported by a pedestal or base 5 to which the electric supply cord 6 for motor 2 extends, and on which a "start-stop" switch 7 is mounted.

The juicer assembly 1 comprises a horizontal, cylindrical body 8 which projects axially outwardly from the motor cap 3; such body, at its inner end, engaging over a metal sheathed, annular hub 9 which projects axially outwardly from said cap 3 in surrounding and supporting relation to a bearing 10 for the drive shaft 4. The inner end of the body 8 engages on the annular hub 9 with a very slight taper fit to provide stability, and said body is releasably secured to the cap 3 in the following manner:

At its inner end the body 8 is formed with an annular, radially outwardly projecting attachment flange 11, which flange is engaged—on the outside—by opposed, radially inturned ears 12 integral with said cap 3. The attachment flange is formed, at opposed points normally disposed equi-distant between the ears 12, with outwardly opening notches 13 whereby upon turning of said body 8 90 degrees in a clockwise direction, the attachment flange 11—together with such body—may be detached from the cap 3, the ears 12 then relatively passing through the notches 13.

Conversely, when it is desired to secure the body 8 in place, the ears 12 are first run through the notches 13 of attachment flange 11, and then said body and the flange are turned 90 degrees counter-clockwise and until a stop 14—which radiates from the periphery of flange 11—abuts the uppermost ear 12. In order to facilitate entry of the attachment flange 11 behind the ears 12, said flange is chamfered at opposite ends of each notch 13, as at 15.

With the foregoing arrangement the body 8, and the remaining parts of the juicer assembly 1 carried thereby, can be readily and conveniently engaged with, or disengaged from, the cap 3 solely by hand.

The body 8, in relation to the position occupied thereby when attached to the cap 3, is fitted—on top and adjacent its inner end—with an upstanding, cylindrical feeder tube or throat 16 adapted to receive a food material advancing plunger 17; the latter including a head 18 which bears on the upper end of the tube 16 when the lower end of the plunger is at the bottom of said tube. Such tube 16 opens at the bottom into the cylindrical body 8, while the latter is formed on the under side with a substantially full-length bottom opening 19 of substantial circumferential extent, but less than 180 degrees.

A snap-on detachable juice outlet spout, indicated generally at 20 and hereinafter described in greater detail, is secured to, and depends from, the body 8 in encompassing relation to said bottom opening 19 therein.

At its outer end the cylindrical body 8 is formed with an integral, axially projecting, outwardly tapered pulp outlet nozzle 21; there being a relatively short, radially inwardly projecting shoulder 22 formed at the adjacent ends of the body 8 and nozzle 21, with said shoulder facing into said body.

The body 8, together with the nozzle 21, is internally surfaced with a roll-formed, molded-in-place stainless steel lining 23.

The snap-on, detachable spout 20, which is relatively short vertically, tapers downwardly and includes sides 24 and ends 25. At the upper edges thereof the sides 24 of spout 20 are formed with full-length, inwardly opening, longitudinal channels 26 which releasably snap-engage with corresponding longitudinally extending, exposed beads 27 formed integrally with the body 8 along opposite sides thereof immediately adjacent the bottom opening 19. As the spout 20 is of molded plastic, the channels 26 have a certain amount of lateral spring, which permits them to releasably snap-engage on said beads 27. In order to manually spring one of the channels 26 laterally outwardly, for release of said channels from the beads 27, a depending finger plate 28 is formed integral with, and depends from, such one channel in clearance relation alongside the spout 20. By grasping the spout 20 in the hand, with a finger against the outside of the plate 28, laterally inward pressure on said plate will spring the related channel 26 outwardly sufficient to permit of ready detachment of the channels 26 from the beads 27, to accomplish removal of the spout 20. When said spout 20 is in place the ends 25, which are concave at their upper edges, matchingly engage the bottom of the body 8 beyond the ends of the bottom opening 19.

A concave, juice strainer plate 29 having very fine perforations is normally disposed in the bottom opening 19 in full closing relation thereto; said strainer plate being concentric to the axis of the cylindrical body 8. Such strainer plate 29 includes a border frame 30 extending about the margin thereof; such border frame being seated in the upper end of the spout 20, and the latter being notched, as at 31, for the reception of said frame in snap-engaged but detachable relation. The arrangement is such that with the strainer plate 29 seated in the upper end of the spout 20, and the latter snap-engaged on the body as hereinafter described, the border frame 30 abuts said body about the entire periphery of the bottom opening 19.

A rotary cutter, indicated generally at 32, is disposed in the body 8 and is carried on, and high-speed rotated by, the drive shaft 4 which projects part way and axially into said body. The rotary cutter 32 is constructed and mounted as follows:

The numeral 33 indicates a generally cylindrical rotor formed internally with an axial bushing 34 which has a bore 35 flat on one side and into which bore the drive shaft 4 slidably engages in matching relation. The rotor 33 extends, in the body 8, from the hub 9 to the shoulder 22, with only sufficient clearance to permit of free rotation. It is therefore unnecessary that the drive shaft 4 have other than a sliding fit in the bore 35.

The rotor 33, which intermediate its ends is of lesser outside diameter than the inside diameter of the stainless steel liner 23 of the body 8, is enlarged at its inner end to form a radial end flange 36, while at its outer end said rotor is radially enlarged to form circumferentially spaced lands 37 which are relatively short longitudinally of said rotor.

A plurality of circumferentially spaced, longitudinally extending cutter blades 38 are embedded in, and extend edgewise radially out from, the rotor 33, with said blades extending full distance between flange 36 and a related one of the lands 37. A majority of the cutter blades 38 are toothed or serrated, as shown, but at least a pair of said blades—opposed on the rotor 33—are straight edged, one of the straight edged cutter blades being indicated at **38*a***.

The circumferentially spaced cutter blades are disposed so that a pair thereof have end termination in each of the lands 37, and such blades run—at their outer or working edges—in adjacent but spaced relation to the stainless steel liner 23 and to the strainer plate 29. Such stainless steel liner 23—within the body 8—is deformed radially inwardly to define a longitudinal, full-length rib 39 on the inside of the liner adjacent but slightly above the bottom opening 19 on the side of said liner which corresponds to the upturning portion of the rotary cutter 32. The rib 39 provides an abutment to aid in the cutting action of the blades 38 and **38*a*** as they sweep past said rib, with extremely close spacing therebetween.

The rotor 33 is formed, in its periphery, with a plurality of circumferentially spaced, longitudinal, round-bottomed grooves 40; such grooves alternating in their spacing with the lands 37, i. e., the grooves are disposed spaced so that their outer ends open to the corresponding end of the rotor 33 between said lands. The grooves 40 taper in width and depth from their outer ends towards their inner ends; i. e., they become progressively narrower and of less depth in such direction.

The inner or working faces 41 of the lands 37 are diagonal, with their leading ends disposed outwardly of their trailing ends longitudinally of the rotor 33, in relation to the direction of rotation as indicated by the arrow in Fig. 2. The purpose of diagonaling the inner faces of the lands 37 will hereinafter be explained.

The rotor 33 merges at its outer end in integral relation with a pulp unloading auger or screw, indicated generally at 42, which is disposed in the nozzle 21; the outer end of said screw 42 terminating short of the corresponding end of said nozzle.

Said pulp unloading auger or screw 42 tapers outwardly in general, and runs in clearance relation in the nozzle 21, but said screw has a particular configuration, as follows:

At its inner end the pulp unloading auger or screw 42 is generally cylindrical and of a diameter approaching that of rotor 33; the longitudinal grooves 40 in the latter—and of which there are four in equally circumferentially spaced relation—continuing outwardly in said inner end portion of said screw 42, as at 43. This leaves—in each circumferential half of the inner end portion of the screw 42—a pair of circumferentially spaced lands 44 and 45. These lands 44 and 45 have diagonal outer working faces 46 and 47, respectively, angled to feed material outwardly; said faces being in substantially a common helical plane or line.

Outwardly of the inner end portion of screw 42 the latter becomes generally oblong or oval in cross section—while continuing the outward taper of said screw—and is formed on each half—i. e., on each broad side of the oval—with another diagonal working face, indicated at 48, likewise disposed to feed material in an outward direction. At the outermost end of the screw 42, and also on each half thereof, the same includes a chamfer 49 similarly disposed to feed material in said direction.

By reason of the foregoing particular configuration of the scew 42, an effective outward feeding action is accomplished without any tendency to clogging in the nozzle 21.

In the juicer assemly, constructed as above, a majority of the parts are of molded plastic, such as "nylon." Such parts include motor cap 3, together with the integral ears 12; the body 8 with the flange 11, tube 16, and nozzle 21 thereon; the rotor 33 and the integral screw 42; the spout 20; and the border frame of the strainer plate 29.

In operation of the juicer the rotary cutter—together with the screw 42—is driven by the motor 2, in the direction indicated by the arrow in Fig. 4, at substantial speed.

The fruit or vegetable from which the juice is to be extracted is disposed in the tube 16 and pressed downwardly therein with the plunger 17, whereby such material is effectively masticated or pulped in the body 8 by the action of the rotary cutter 32, which action is enhanced by the cutter blades sweeping the material against the rib 39, which material is also constantly swept over the strainer plate 29, permitting the juice to escape downwardly therethrough into the spout 20, and from the latter into a receiving container (not shown) disposed therebelow.

During operation of the rotary cutter 32 the pulp is received in the grooves 40 and continuously feeds lengthwise therein toward the outer end of the rotary cutter 32, whence said pulp—continuing its flow in the groove portions 43 of the screw 42—is acted upon by the latter to force such pulp outwardly in the nozzle 21 for final discharge therefrom. The particular configuration of the screw 42, as described, permits a substantial amount of the pulp to be received in and fed along the nozzle 21 without undesirable back pressure or clogging.

In order to assure that the pulp as delivered into the nozzle 21 does not carry with it any appreciable amount of the juice, I provide the diagonal working faces 41 on the lands 37. These diagonal faces 41—with rotation of the rotary cutter 32—tend to feed the free juice in the body 1 inwardly; i. e., in a direction away from the discharge ends of the grooves 40, and also create a suction which—acting on the pulp at the forward ends of said grooves 40—withdraws any remaining juice therefrom, and before the pulp passes into the nozzle 21.

During operation of the juicer it is essential that the juice be prevented from flowing between the inner end of the rotor 33 and the hub 9, which would undesirably permit such juice to gain access to the bearing 10. I therefore provide the following pressure arrangement or "slinger" at said inner end of the rotor 33, and as shown in detail in Fig. 5.

At its inner end the rotor 33 is formed with a circumferential groove 50 concentric to the rotor axis, and of a diameter such that said groove opens against the end of hub 9. Radially outwardly of the circumferential groove 50 the inner end of the rotor 33 includes opposed, circumferentially facing but diagonal shoulders 51, which shoulders face generally in the direction of rotation, with the portion of the rotor end immediately ahead of such shoulders being relieved. Such relief of the rotor end of course produces the shoulders 51; the latter being disposed so that their inner ends lead their trailing ends. As a result, the shoulders 51—upon rotation of the rotor 33 in the indicated direction—produce a radially outward impelling action, sucking any juice which may be present in the groove 50 therefrom and delivering such juice back into the body 8.

With the described juicer, the juice of fruit and vegetables, or other food materials, can be effectively, positively, and rapidly extracted, with the juice retaining the natural values.

In the description of the structure and function of the appliance heretofore it has related to its use as a juicer, but such appliance is also readily adapted for use as a shredder, or homogenizer, by the simple substitution of certain interchangeable parts, as shown particularly in Figs. 6 and 7.

For shredding, or homogenizing, food materials the rotary cutter 32 of Fig. 2 is replaced by the rotary cutter shown in Fig. 6, and indicated generally at 52. Such rotary cutter 52 includes a smooth-faced rotor 53. This rotor 53 omits the pulp unloading auger or screw of the primary embodiment but includes—as before—an enlarged inner end flange 54 and the circumferentially spaced, outer end lands 55.

Between the flange 54 and lands 55 the rotor 53 is fitted with a plurality of equally circumferentially spaced, longitudinal cutter blades 56, all of which have serrated edges.

In addition to the substitution of the rotary cutter 52 of Fig. 6 for the rotary cutter 32 of Fig. 2, the strainer plate 29 is removed—by detachment of the spout 20—and a concave filler plate or blank 57—as shown in Fig. 7—is substituted. Such concave filler plate or blank 57 includes longitudinal supporting flanges 58 which engage in the related notches 31 of the spout, whereby when the latter is replaced on the body 8, the filler plate or blank 57 completely closes the bottom opening 19 in said body.

On its inner or concave face the filler plate or blank 57 has a plurality of longitudinal, circumferentially spaced ribs 59; such ribs serving—in cooperation with the rotary cutter 52—to assure of complete shredding, or homogenizing, of the food material introduced into the body 8 from the feed tube 16.

The shredded, or homogenized, food material delivers from the body 8 into the nozzle 21 through the spaces or gaps which exist between the lands 55.

I have therefore provided an appliance which may be used effectively either as a juicer, shredder, or homogenizer, and for any such purpose the appliance functions in a highly successful manner.

From the foregoing description it will be readily seen that I have provided such an appliance as will fully fulfill the objects of the invention, as set forth herein.

While this specification sets forth in detail the present and preferred construction of the appliance, still in practice such deviations therefrom may be resorted to as do not form a departure from the spirit of the invention, as defined by the appended claims.

Having thus described the invention, the following is claimed as new and useful, and upon which Letters Patent are desired:

1. A food material masticating appliance comprising, with an electric motor having an end cap, a drive shaft projecting through the end cap, a hub on the cap surrounding the shaft in spaced relation, and a shaft bearing in the hub; a cylindrical body engaged at one end of the hub and projecting axially therefrom about the shaft, means securing the body to the cap, a rotary cutter mounted on the shaft, means to feed food material into the body at one point, the rotary cutter being operative to reduce food material in the body to a pulp, means to permit the pulp to escape from the body at another point, centrifugal pressure means to prevent juice from the reduced food material in the body from passing between the hub and adjacent end of the rotary cutter and gaining access to said bearing; said centrifugal pressure means including circumferentially spaced diagonal shoulders on said adjacent end of the rotary cutter adjacent the periphery thereof and facing in the direction of rotation, the inner ends of said diagonal shoulders leading the outer ends relatively to said direction of rotation, and said adjacent end of the rotary cutter having an annular groove therein inwardly of said shoulders.

2. An applicance to masticate fruits and vegetables into pulp and juice form comprising a rigidly supported cylindrical body, a motor driven rotary cutter in the body, means to feed food material into the body adjacent the top thereof and for reduction to pulp and juice therein by said rotary cutter, a pulp outlet nozzle communicating with and projecting from one end of the body, the latter having a bottom opening, a downwardly extending spout below the body and in communication with said bottom opening, means detachably mounting the spout in connection with the body, a plate disposed in a position embracing said bottom opening, and means removably supporting the plate on the spout in said position; the spout including sides of springable material; said spout mounting means including inwardly opening integral channels along the upper edges of said sides, correspondingly exposed beads on the sides of the body, the channels being releasably snap-engaged on said beads, and a finger member formed integral with one channel and depending therefrom in clearance relation to one of said sides of the spout.

3. An appliance to masticate fruits and vegetables into pulp and juice form comprising a rigidly supported cylindrical body, a motor driven rotary cutter in the body, means to feed food material into the body adjacent the top thereof and for reduction to pulp and juice therein by said rotary cutter, a pulp outlet nozzle communicating with and projecting from one end of the body, the latter having a bottom opening, a concave plate for said bottom opening, and means mounting the concave plate in connectaion with the body in position embracing said bottom opening; the rotary cutter including a cylindrical rotor, a plurality of circumferentially spaced longitudinal cutter blades mounted on the rotor and projecting edgewise therefrom, the rotor having longitudinal grooves therein between certain adjacent cutter blades, said grooves opening longitudinally outward at one end into the nozzle, and radially enlarged lands on the rotor at the same end; the lands being between other adjacent cutter blades, and having diagonal inner working faces whose leading ends are disposed longitudinally outward of the corresponding trailing ends relative to the direction of rotation.

4. An appliance, as in claim 3, in which the grooves are round-bottomed, and progressively increase in width and depth in a longitudinal outward direction.

5. An appliance, as in claim 3, including a pulp unloading screw in the nozzle, said screw being a rigid extension of the rotor, the nozzle tapering toward its outer end, and the screw having generally a corresponding taper and running in clearance relation in said nozzle; and said screw including radially enlarged, circumferentially spaced lands thereon at its inner end portion, the rotor grooves extending into the screw between said lands on the screw, and the outer working faces of the lands on said screw being diagonal in a direction to feed pulp longitudinally outwardly in the nozzle.

6. An appliance, as in claim 5, in which the screw, in the portion outwardly of said inner end portion, is generally oval in cross section, and said outer portion of the screw having other working faces on opposite sides thereof diagonal in a direction to feed pulp likewise longitudinally outwardly in the nozzle.

References Cited in the file of this patent

UNITED STATES PATENTS

| | | |
|---|---|---|
| 1,268,619 | Reeves | June 4, 1918 |
| 2,214,075 | Crawford | Sept. 10, 1940 |
| 2,315,028 | Thomas | Mar. 30, 1943 |
| 2,325,006 | Crawford | July 20, 1943 |
| 2,345,683 | Owens | Apr. 4, 1944 |
| 2,358,170 | Krueger | Sept. 12, 1944 |
| 2,510,420 | Ross | June 6, 1950 |
| 2,531,250 | Bopp | Nov. 21, 1950 |
| 2,558,799 | Thomas | July 3, 1951 |

FOREIGN PATENTS

| | | |
|---|---|---|
| 8,084 | Great Britain | of 1912 |